United States Patent
Erlandson et al.

[15] 3,652,818
[45] Mar. 28, 1972

[54] INERT ATMOSPHERE SEAM WELDER

[72] Inventors: Paul M Erlandson, Palos Park; Anton A. Aschberger, Oak Lawn; Donald J. Roth, Chicago Heights; John T. Cary, Markham; George F. Bartimes, Chicago, all of Ill.

[73] Assignee: Continental Can Company, Inc., New York, N.Y.

[22] Filed: July 31, 1970

[21] Appl. No.: 59,938

[52] U.S. Cl. ..........................219/72, 219/64, 219/74, 219/84
[51] Int. Cl. ..........................B23k 9/16
[58] Field of Search ..........................219/64, 72, 74, 84

[56] References Cited

UNITED STATES PATENTS

| | | | |
|---|---|---|---|
| 1,749,765 | 3/1930 | Hendrickson | 219/74 |
| 2,794,108 | 5/1957 | Park | 219/67 |
| 2,223,270 | 11/1940 | Quarnstrom | 219/72 X |

FOREIGN PATENTS OR APPLICATIONS

| | | | |
|---|---|---|---|
| 65,888 | 2/1914 | Austria | 219/72 |

Primary Examiner—R. F. Staubly
Assistant Examiner—Hugh D. Jaeger
Attorney—Diller, Brown, Ramik and Holt

[57] ABSTRACT

This disclosure relates to a resistance seam welder for welding lapped sheet material, particularly can bodies, and includes means for effecting inert gas flow between roller electrode surfaces and the interface of the lapped can body edge portions, the flow effecting means being in the form of a manifold into which is introduced inert gas while flexible sealing means are provided for sealingly contacting opposite surfaces of the can body edge portions. In one embodiment of the invention the manifold is formed of two hollow bodies having pairs of walls in sealing contact with at least one pair of the walls being flexible to permit the passage of the lapped edges therethrough as the can body blank is moved along an associated horn. In an alternative embodiment the walls are relatively rigid and each carries flexible seals to permit the passage of can body blanks therethrough. In a final embodiment, the manifold is defined by a plurality of radial ports formed in the roller electrodes with each electrode carrying a pair of annular seals for localizing the inert gas at the seam as it is being welded.

12 Claims, 8 Drawing Figures

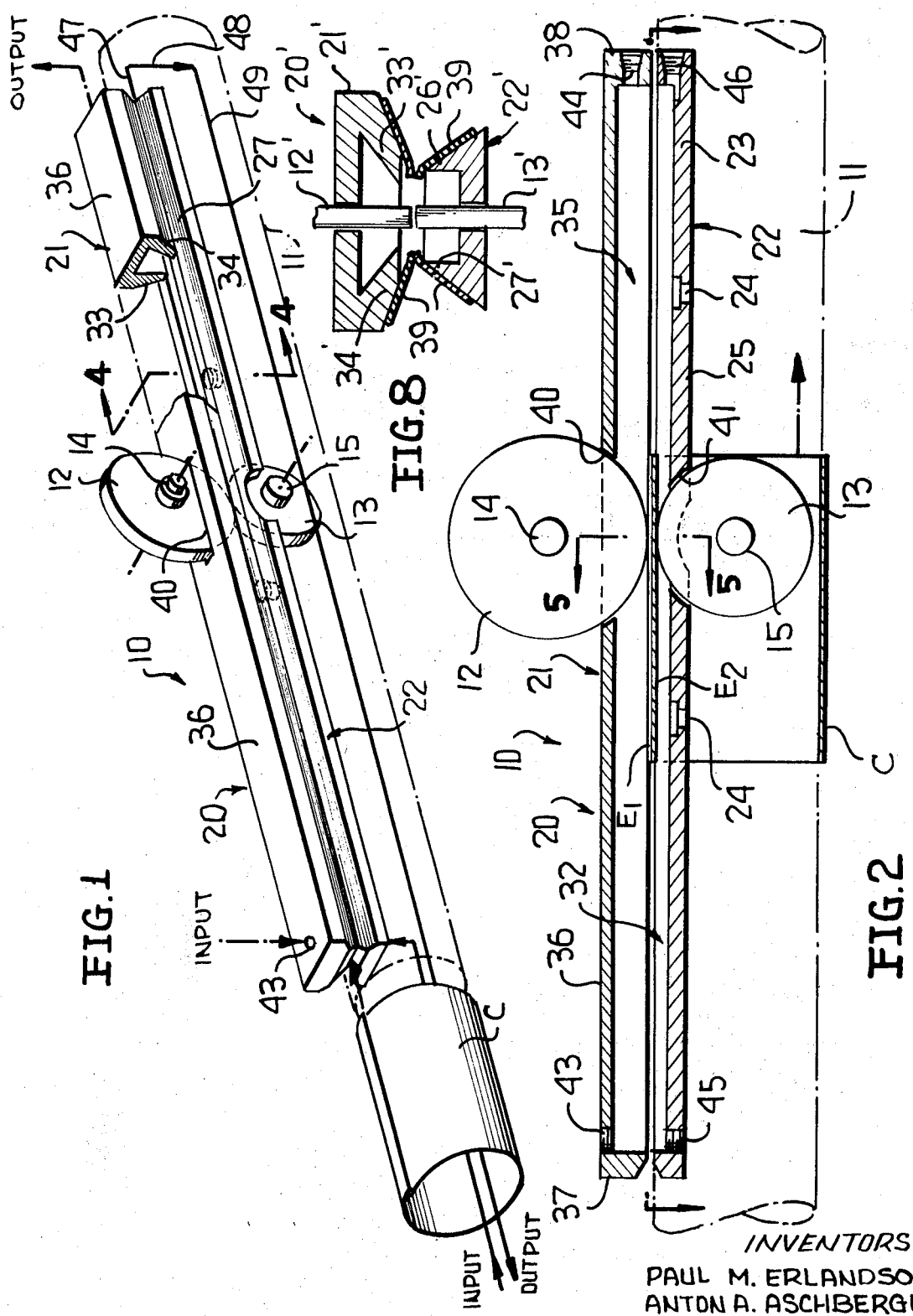

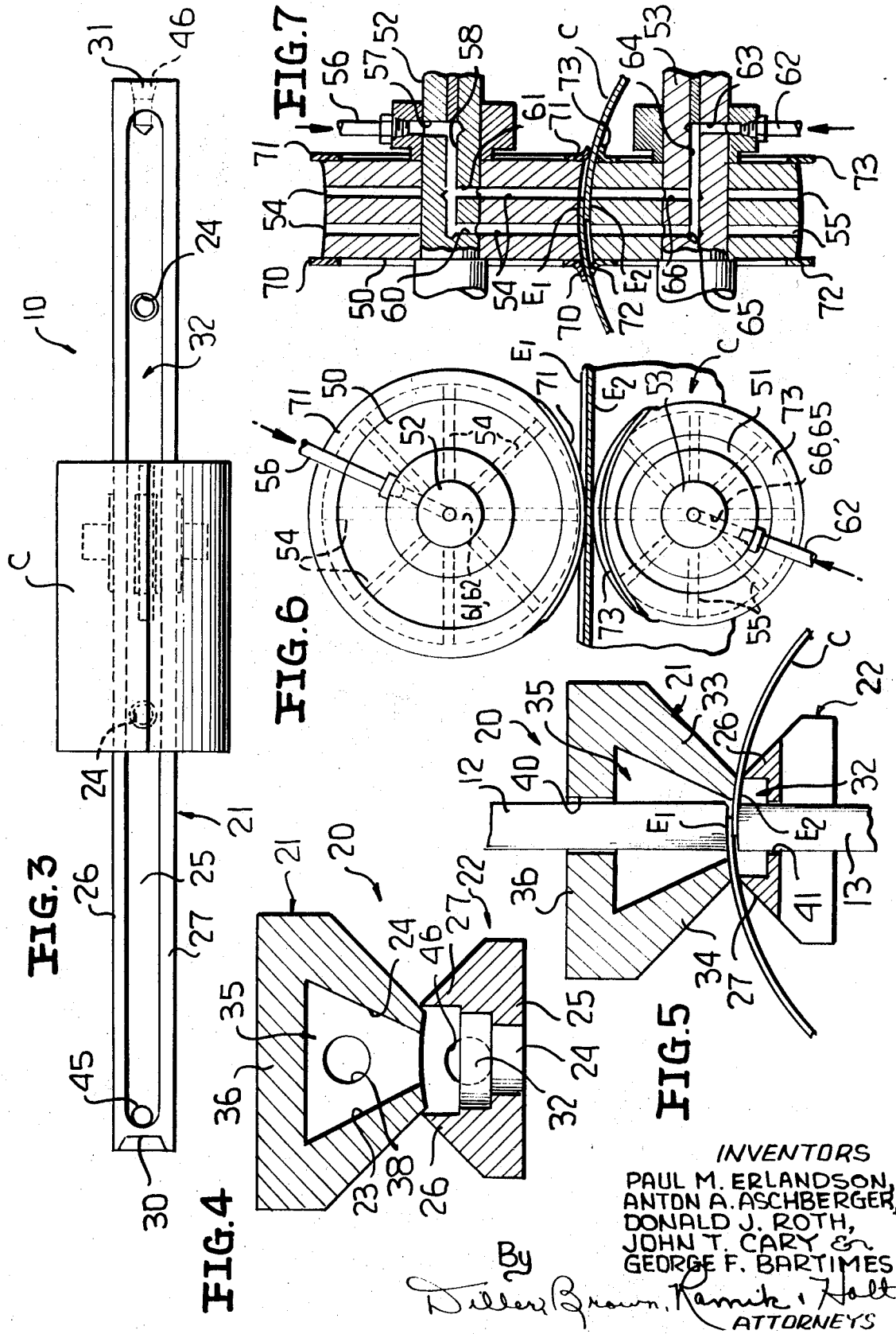

INERT ATMOSPHERE SEAM WELDER

A primary object of this invention is to provide a resistance seam welder which during a seaming operation effects inert gas flow between the roller electrodes and the interface of the lapped edges of the workpiece which is being seamed. The welder is particularly designed for seam welding can or container bodies and provides the following advantages:

Through the use of an inert atmosphere decoration and protection are improved for two reasons, namely, color contrast between the welded seam and the container body is lessened and therefore the can body is more easily and thus more cheaply covered by base, decorative, or protective paints, inks, etc. As opposed to welding under atmospheric conditions which results in the formation of a relatively dark oxide around the seam which contrasts with the remainder of the can body surface, a uniform coating along the seam is achieved.

Secondly, by not welding in atmosphere but rather in an inert atmosphere the usually formed oxide layer is reduced and results in less "peeling." When welding can body seams in atmosphere a relatively brittle oxide forms which tends to crack easily or peel because the adherence between the oxide and the can body metal proper is poor. Inasmuch as the can body blanks are normally painted, printed, etc., prior to the seaming operation, as the oxide separates from the remainder of the seam the decorative paint and/or ink on the outside is removed while the usual protective inner seam coating may likewise peel from the seam.

Just as important from the standpoint of achieving commercially acceptable and esthetic can bodies is prolonged life of the roller electrodes since the inert atmosphere likewise reduces the oxidation thereof. The roller electrodes are normally constructed from copper and copper alloys which oxidize easily in air. The oxide is a relatively high resistance coating which increases heating at the electrode-workpiece-electrode interface thereby accelerating further oxide formation and electrode deterioration, as well as reducing weld quality. This situation is alleviated by the seam welder of the present invention by enclosing the electrodes partially or entirely in a protective inert atmosphere. In addition, the flow of the inert gases provides direct electrode cooling thereby additionally reducing the rate of oxidation.

In accordance with the foregoing objects, the resistance seam welder of the present invention includes a conventional horn along which can body blanks in tubular form with the edge portion in lapped relation are conveyed toward and between a pair of roller electrodes suitably and conventionally connected to an electrical energy source. However, apart from this conventional structure, the welder includes manifold means for effecting the flow of inert gas between and around the electrodes and between the interface of the lapped can blank edges. In one embodiment of the invention, the manifold means is in the form of a pair of hollow bodies which include pairs of side walls normally in sealing relationship. At least two of the side walls are flexible to permit the tubular can body blank to be passed between the manifold bodies to and through the roller electrodes. Both manifold bodies are provided with inlets and outlets which are suitably connected to a source of inert gas, such as argon, but preferably carbon dioxide is used because of its lesser cost and greater commercial availability. The inert gas may be introduced into each hollow manifold body under pressure to achieve the flow around the electrodes and through the lapped can body edges. However, it is also possible to draw a vacuum in one of the manifold bodies while introducing the inert gas into the other thereby achieving a like flow. In either case, however, the inert gas prevents atmosphere from adversely oxidizing the seam as well as the electrodes thereby overcoming the disadvantages of conventional welding systems herebefore described.

In another embodiment of the invention, the manifold means is likewise in the form of a pair of hollow bodies which include pairs of relatively rigid side walls normally in spaced relationship. However, each of these side walls carries an elongated flexible seal opposed seals normally being in contacting sealing relationship. Thus, as a can body is moved between the seals, the latter deflect to permit the passage of the can body therethrough while preventing the escape of the inert gas.

Preferably, in both of the latter-described embodiments the velocity of the inert gas flow is preferably laminar so that the interior of the manifolds, as well as the lapped edge portions of the can bodies passing therethrough, are purged or cleaned of air. The sealing strips or the flexible side walls permit the velocity of the inert gas to be adjusted to be greater than the can body travelled therethrough to achieve this purging, while outward leakage is relatively small.

In another embodiment of the invention, the manifold is formed by the roller electrodes themselves by providing each with a plurality of circumferentially spaced radial ports which open through the peripheral contact surfaces of the electrodes. The side periphery of each electrode is provided with annular deflectable seals to localize the inert gas in the area of the weld as it is being formed. The seals necessarily deflect to permit the passage of the can body edges to and through the electrodes.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a perspective view of the resistance seam welder of this invention with portions thereof broken away for clarity, and illustrates a pair of roller electrodes projecting into a manifold formed by a pair of hollow bodies each having a pair of side walls and a container positioned upon a horn, shown in phantom outline, prior to being introduced into the manifold.

FIG. 2 is an enlarged longitudinal sectional view of the manifold of FIG. 1, and more clearly illustrates a chamber defined by the manifold bodies and a can body blank positioned with its lapped edge portions between the roller electrodes.

FIG. 3 is a sectional view taken generally along line 3—3 of FIG. 2, and illustrates the position of the can body and particularly the lapped edges thereof with respect to the lower electrode.

FIG. 4 is an enlarged sectional view taken generally along line 4—4 of FIG. 1, and illustrates the pair of walls of each of the manifold bodies normally in sealing relationship with each other.

FIG. 5 is a fragmentary enlarged sectional view taken generally along line 5—5 of FIG. 2 and illustrates the manner in which the pair of walls of the upper manifold body deflect during the passage of the can body therealong to and through the electrodes.

FIG. 6 is a fragmentary side elevational view of a modification of the welder of FIGS. 1 and 2, and illustrates an inert gas manifold formed by radial ports in each of the electrodes and annular seals carried by the sides thereof.

FIG. 7 is a cross-sectional view taken generally through the axes of the electrodes of FIG. 6, and more clearly illustrates the plurality of ports thereof and the manner in which the seals deflect to permit the passage of a tubular can body to, through and beyond the electrodes.

FIG. 8 is a cross-sectional view of another manifold constructed in accordance with this invention similar to the manifold illustrated in FIG. 5, and illustrates a pair of relatively rigid manifold bodies, each of which carries along pairs of side walls thereof resilient deflectable sealing strips.

The resistance seam welder of this invention is generally designated by the reference numeral 10 and includes a conventional horn 11 of a circular cross section which is suitably supported at its left end, as viewed in FIGS. 1 and 2. Conventional means (not shown) are provided for forming an uniplanar can body blank into a tubular can body C with edge portions E1, E2 in lapped relationship, as is best illustrated in FIG. 5.

The welder 10 includes a pair of conventional roller electrodes 12, 13 mounted for rotation by respective shafts 14, 15. The shaft 14 is conventionally journaled to the welder framework (not shown) while the shaft 15 is conventionally journaled within the horn 11. The details of the mounting of the electrodes 12, 13 as well as the connections thereof to a suitable source of electrical energy form no part of this invention and inasmuch as the same are conventional, these details are not illustrated and are unnecessary for a complete understanding of this invention.

The welder 10 additionally includes manifold means generally designated by the reference numeral 20 for effecting inert gas flow between and around the electrodes 12, 13 as well as between the interface (unnumbered) of the lapped edge portions E1, E2. The manifold means 20 includes an upper hollow manifold body 21 suitably supported in a conventional manner (not shown) to the welder framework and a lower hollow manifold body 22 secured in a recess 23 of the horn 11 by bolts (not shown) passing through suitable apertures 24 in a lower wall 25 thereof.

Referring particularly to FIGS. 2 through 4, the lower manifold body 22 includes a pair of upstanding side walls 26, 27 and end walls 30, 31 which with the bottom 25 define a chamber 32. As is best illustrated in FIG. 4, the walls 26, 27 terminate at relatively sharp edges (unnumbered), as viewed in cross section and cooperate to normally maintain downwardly converging resilient walls 33, 34 of the upper manifold body 21 in sealed relationship along the entire length of the walls 26, 33 and 27, 34. The purpose for the relationship of the walls 26, 27, 33 and 34 will be described hereinafter more particularly with respect to FIG. 5.

The upper manifold body 21 likewise defines a chamber 35 formed by the walls 33, 34, a top wall 36, and end walls 37, 38 (FIG. 2). The upper wall 36 of the manifold body 21 includes a slot 40 (FIGS. 1 and 5) for receiving the electrode 12 while the lower wall 25 of the manifold body 22 likewise includes a slot 41 for receiving the electrode 13. Though by this construction portions of the electrodes 12, 13 are exposed to atmosphere, in further keeping with this invention both electrodes 12, 13 can be entirely encased in a rectangular housing.

The upper manifold body 21 includes a pair of ports 43, 44 formed in the respective walls 36, 38 (FIGS. 1 and 2). The port 43 is connected by an appropriate fitting and conduit (not shown) to a source of inert gas, such as carbon dioxide, which is also preferably under pressure greater than atmospheric, while the port 44 serves as a vent which may, if desired, be connected to a pump to augment the flow of the inert gas through the chamber 35 from left-to-right as viewed in FIG. 2.

The manifold body 22 likewise includes ports 45, 46 in the walls 25, 31 thereof which are respectively connected by conventional means (not shown) to a source of inert gas and to a pump for venting purposes to establish left-to-right flow of the inert gas through the chamber 32. Since the end of the horn 11 is to the right, as viewed in FIGS. 1 and 2, the connection of the port 46 to a pump or other outlet must be made through the horn and this is accomplished by passages or conduits 47 through 49. It is to be noted that when inert gas is introduced into the chambers 32, 35, the same will flow around and about the portions of the electrodes 12, 13 continually presented into the chambers due to the rotation of the electrodes as well as above and below the lapped edge portions E1, E2 and between the interface (unnumbered) therebetween. Thus, during a welding operation the inert gas substantially precludes atmosphere from entering the manifold 20 and thus undesired oxidation of the electrodes 12, 13 and the eventually formed seam is precluded and/or reduced.

As was heretofore noted, as opposed to the pressure—pressure flow of the inert gas in the chambers 32, 35, one of the chambers may be provided with inert gas under pressure while a vacuum is drawn in the other chamber. For example, assuming that inert gas is flowing through the chamber 35 in the manner heretofore described, a closed plug could be screwed in the port 45 and the conduit 47 when coupled to a conventional vacuum source, such as a vacuum pump, would draw the inert gas the entire length of the chambers 32, 35 about the electrodes 12, 13, the edge portions E1, E2, and between the interface thereof.

Reference is now made to FIG. 8 wherein there is illustrated another resistance seam welder which is virtually identical to the resistance seam welder 10 of FIGS. 1 through 5, and thus like reference numerals bearing primes have been used to designate roller electrodes 12', 13', manifold bodies 21', 22', and side walls 33', 34' and 26', 27'. However, as opposed to the manifold means 20 of the welder 10, the manifold means 20' and particularly the manifolds 21', 22' are constructed from relatively rigid material and the walls 26', 33' and 27', 34' are normally at all times maintained in spaced relationship to each other. However, a seal is achieved by conventionally securing to the latter-noted walls a plurality of identical elongated sealing strips 39 having end portions (unnumbered) which are normally in contact with each other. Though not illustrated, when the can body C passes between the manifold bodies 21', 22', the inner surfaces of the lapped edge portions E1, E2 (not shown) are internally engaged by the seals 39, 39 carried by the walls 26', 27', while the outer surfaces of the edge portions E1, E2 are engaged by the ends of the seals 39, 39 carried by the side walls 33', 34'.

Reference is now made to FIG. 5 of the drawings which illustrates the can body C as it moves along the manifold 20 between the electrodes 12, 13 during which time the edge portions E1, E2 are welded to form the seam. By comparing FIG. 5 with FIG. 4, it will be noted that prior to the introduction of the can body C into the manifold 20 the side walls 33, 34, form a seal with the side walls 26, 27. However, due to the resilient nature of the side walls 33, 34, the same flex inwardly (FIG. 5) as the can body C is introduced therebetween at the left end of the manifold 20, as viewed in FIG. 1. From the point of introduction of the can body C into the manifold 20 until its departure the seal shown in FIG. 5 is maintained with the ends (unnumbered) of the walls 33, 34 being in contact with the exterior surface (unnumbered) of the can body C while a like seal is formed between the inner surface of the can body C with the side walls 26, 27. Thus, during the entire movement of the can body C through the manifold, and particularly during the time of its passage between the electrodes 12, 13, atmosphere is precluded from adversely affecting the electrodes or the edge portions E1, E2 and the eventually formed seam.

Reference is now made to FIGS. 6 and 7 wherein in lieu of the manifold 20 and electrodes 12, 13 the welder includes a pair of roller electrodes 50, 51 conventionally supported for rotation by shafts 52, 53, respectively. As opposed to the elongated manifold 20 of the welder 10 the electrodes 50, 51 themselves define manifold means in the form of a plurality of radial ports 54, 55 which are circumferentially spaced about the electrodes 50, 51 and open outwardly through peripheral surfaces (unnumbered) thereof. Sixteen ports or passages 54, 55 are formed in each of the respective electrodes 50, 51, although the number, spacing and shape may vary, as found necessary or desirable. Inert gas from a suitable source (not shown) is conducted into the passages 54 by a conduit 56, a radial passage 57 and an axial passage 58 in the shaft 52, the latter passage of which includes a pair of ports 60, 61 in alignment with the passages 54. Thus as the roller electrode 50 rotates each pair of passages 54 is brought into registration with the ports 60, 61 in an approximate vertical plane to distribute inert gas on both sides of the lapped edge portions E1, E2 of the can body C in the manner clearly illustrated in FIG. 7.

Likewise, inert gas is conducted to the inside of the container C and to opposite sides of the lapped edge portions by means of a conduit 62, a radial passage 63 and an axial passage 64 formed in the shaft 53, and a pair of ports 65, 66 in registration with the passages 55 when the latter are in a vertical plane. In this manner inert gas is directed in the area of the lapped edge portions in an automatic cyclical manner as the electrodes 50, 51 rotate, and as in the case of the manifold 20, oxidation is reduced and/or eliminated.

In order to assure the entrapment of the inert gas during the formation of the seam, each of the roller electrodes 50, 51 includes a pair of annular seals 70, 71 and 72, 73. The peripheries of the seals project beyond the peripheries of the electrodes 50, 51, and during the passage of the can body C therebetween the seals deflect, as shown in FIG. 7, to permit the can body C to readily pass between the electrodes while maintaining the necessary seal to preclude atmosphere from producing oxidation and the disadvantages therefrom heretofore noted.

In further keeping with this invention, it is also pointed out that the roller electrodes 50, 51 can be employed in the welder 10 in lieu of the respective electrodes 12, 13. In this case not only would additional inert gas be introduced into the chambers 32, 35 but it would be localized immediately at the point of weld. Furthermore, the seals 70 through 73 could be enlarged inwardly or formed as complete circles to seal against the longitudinal sides (unnumbered) of the slots 40, 41 thus additionally precluding the introduction of air into the manifold 20. When so constructed the only clearance would be that between the peripheries of the lower electrodes and the short or transverse edges of the slots 40, 41.

From the foregoing descriptions it will be noted that due to the resilience of the walls 33, 34 and the seals 70 through 73 no interference occurs during the movement of the can bodies C through the welders and the can body or any similar workpiece can be conveyed continuously or in an interrupted fashion. Moreover, in both cases an automatic seal develops when a workpiece is not present either between the manifold bodies 21, 22 or between the electrodes 50, 51.

In both embodiments, maximum gas efficiency is achieved by protecting the can body only in the weld area, although in the case of the manifold 20 the length thereof to the left and to the right of the electrodes may be varied as found necessary in field operations. One major advantage of the relatively longer manifold is the ease of controlling the gas velocity as well as its flow characteristics by the relatively small size or low volume of the chambers 32, 35 and the fact that the inlets and outlets are at opposite ends of the manifold with the direction of gas flow being the same as that of the can body movement through the manifold. So far as manifold length is concerned, that portion of the manifold 20 toward the inlet end thereof must be sufficient to prevent oxidation of the weld in the weld zone, i.e., to insure complete removal or mixing of the air carried in with the inert gas of the chamber while the distance between the electrodes and the exit end of the manifold must be sufficient to allow the weld seam to cool to below 380° F, the temperature at which visible oxide is formed.

The major advantage of the arrangement shown in FIGS. 6 and 7 is, of course, that of directing the inert gas directly at the point of weld thereby eliminating the need for a separate housing where space is limited. However, in both cases the provision of means to effect the flow of an inert atmosphere in the manner described protects the area of the weld from excess oxidation so that protective coatings, etc., may be placed on the workpiece without encountering difficulties in covering or subsequent peeling, while electrode life is prolonged due to reduced oxidation and cooling by the flow of the inert gas thereby achieving improved weld quality and reliability while reducing unwanted heating and power losses.

While preferred forms and arrangements of parts have been shown in illustrating the invention, it is to be clearly understood that various changes in details and arrangement of parts may be made without departing from the spirit and scope of this disclosure.

We claim:

1. A resistance seam welder for lapped sheet material edge portions comprising a support, a first electrode carried by said support, a second electrode opposing said first electrode and cooperable therewith to effect the resistance seam welding of material, each of said electrodes having a contact surface between which lapped sheet material edge portions are adapted to pass, means conveying the lapped sheet material edge portions between and in contact with said contact surfaces, and means for effecting inert gas flow between and around said electrode surfaces, said means further effecting an inert gas flow between and through the interface of the lapped sheet material edge portions during the conveying thereof to said contact surfaces.

2. The resistance seam welder as defined in claim 1 wherein said flow effecting means includes manifold means into which is adapted to be introduced inert gas, and flexible sealing means for sealingly contacting opposite surfaces of said sheet material at opposite sides of the lapped edge portions thereof for confining the flow of the inert gas during the conveying of the lapped sheet material edge portions.

3. A resistance seam welder for lapped sheet material edge portions comprising a support, a first electrode carried by said support, a second electrode opposing said first electrode and cooperable therewith to effect the resistance seam welding of material, each of said electrodes having a contact surface between which lapped sheet material edge portions are adapted to pass, and means for effecting inert gas flow between said electrode surfaces and between an interface of the sheet material edge portions, wherein said flow effecting means includes manifold means into which is adapted to be introduced inert gas, flexible sealing means for sealingly contacting opposite surfaces of said sheet material at opposite sides of the lapped edge portions thereof for confining the flow of the inert gas, said manifold means is defined by said electrodes, said electrodes are roller electrodes, and said sealing means are carried by said electrodes.

4. The resistance seam welder as defined in claim 2 wherein said sealing means are carried by said electrodes.

5. The resistance seam welder as defined in claim 2 wherein said manifold means is defined by a pair of hollow bodies defining a chamber, and said sealing means normally maintain said hollow bodies in sealed relationship.

6. The resistance seam welder as defined in claim 2 wherein said manifold means is defined by a pair of elongated hollow bodies defining a chamber, and said sealing means are a pair of seals of one of said bodies normally sealingly contacting a pair of seals of the other of said bodies.

7. The resistance seam welder as defined in claim 2 wherein said manifold means is defined by a plurality of circumferentially spaced radial ports in each of said electrodes, and said electrodes are roller electrodes.

8. The resistance seam welder as defined in claim 2 wherein said manifold means is defined by a plurality of circumferentially spaced radial ports in each of said electrodes, said electrodes are roller electrodes, and said sealing means are defined by a pair of spaced annular seals carried by each electrode and projecting beyond the associated periphery thereof.

9. The resistance seam welder as defined in claim 2 wherein said manifold means is defined by a pair of hollow bodies defining a chamber, said sealing means include a pair of walls defined by each hollow body, the pair of walls of one of said bodies being normally in sealing contact with the walls of the other hollow body, and at least one of said pair of walls is formed of deflectable material to permit the passage of the sheet material edge portions therebetween.

10. The resistance seam welder as defined in claim 5 wherein at least said electrode contact surfaces are housed within said manifold.

11. The resistance seam welder as defined in claim 6 wherein each hollow body is defined in part by a pair of side walls, each side wall of one hollow body is in generally opposed relationship to a side wall of the other hollow body, and each one of said seals is carried by each one of said side walls.

12. The resistance seam welder as defined in claim 6 wherein each hollow body is defined in part by a pair of side walls, each side wall of one hollow body is in generally opposed relationship to a side wall of the other hollow body, and each one of said seals is defined by each one of said side walls.

* * * * *